Figure 1:
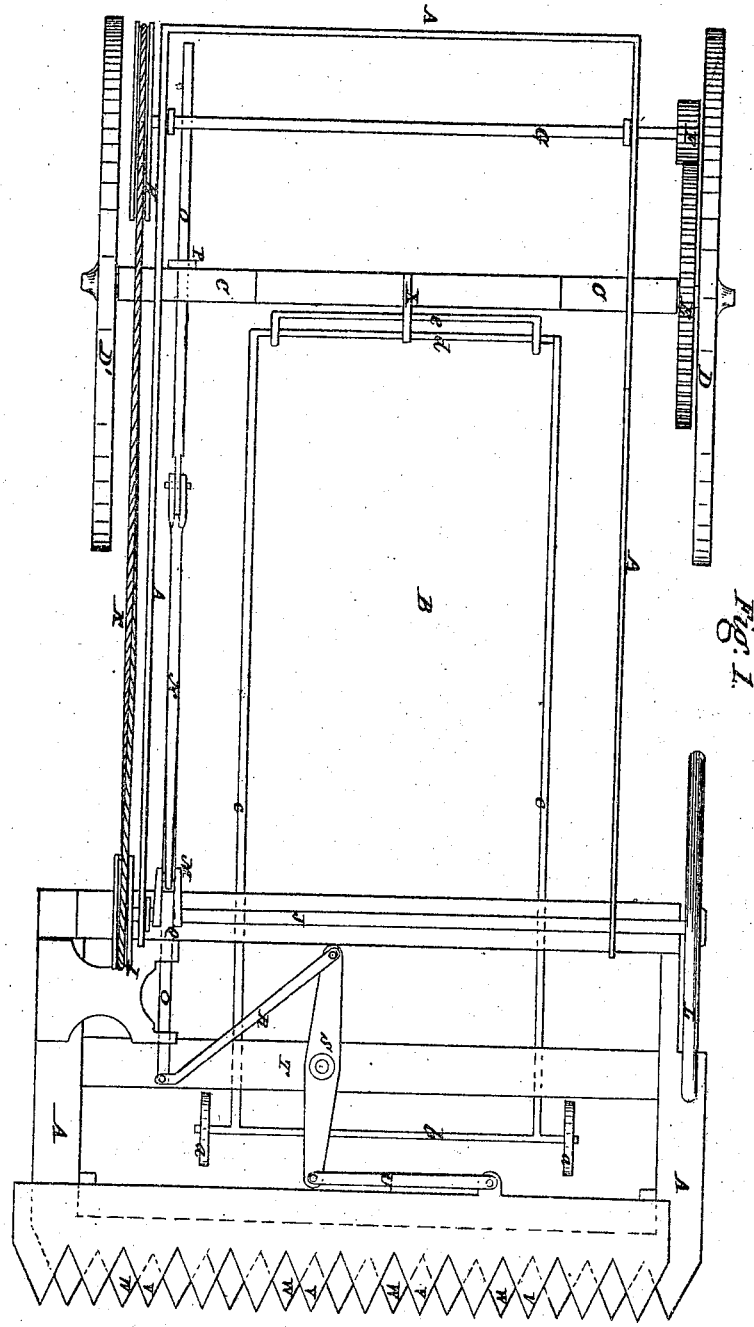

R.J. Morrison,
Mower.

N° 12,393.   Patented Feb. 13, 1855.

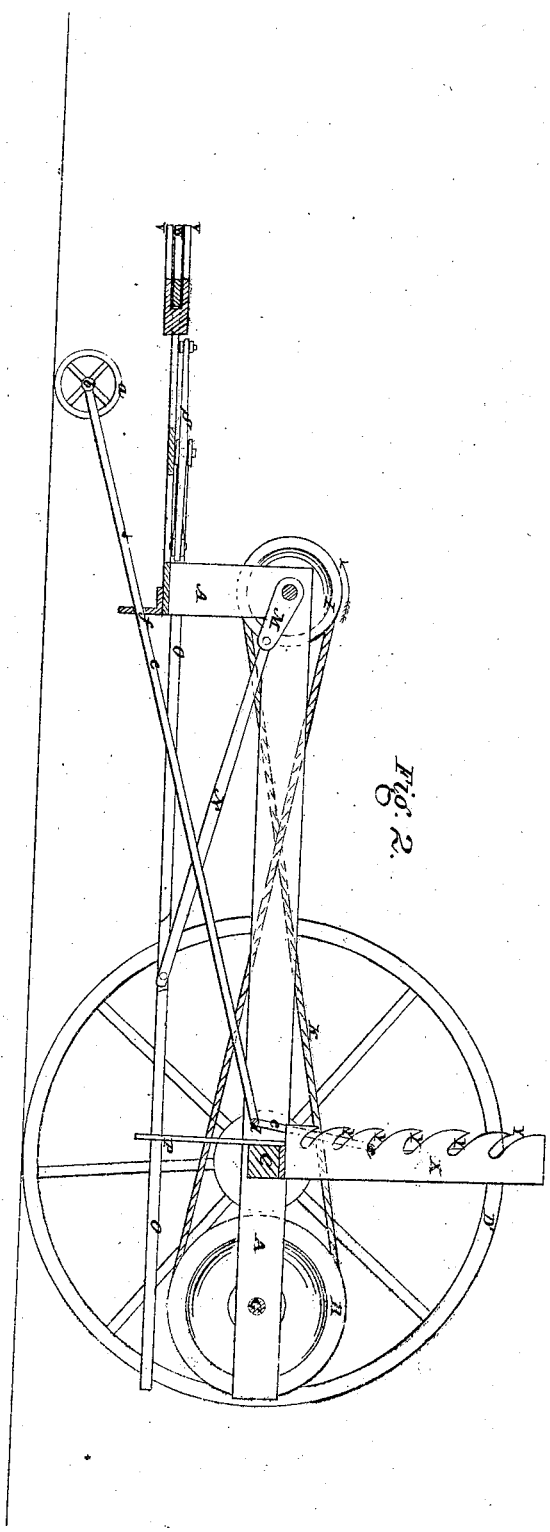

UNITED STATES PATENT OFFICE.

ROBERT J. MORRISON, OF RICHMOND, VIRGINIA, ASSIGNOR TO R. J. AND E. A. MORRISON.

IMPROVEMENT IN GRASS-HARVESTERS.

Specification forming part of Letters Patent No. 12,393, dated February 13, 1855.

*To all whom it may concern:*

Be it known that I, ROBERT J. MORRISON, of Richmond, in the county of Henrico and State of Virginia, have invented certain new and useful Improvements in Reaping-Machines; and I do hereby declare the following to be a full, clear, and exact description of the same, reference being had to the accompanying drawings, making a part thereof, in which—

Figure 1 represents a top view, and Fig. 2 represents a central longitudinal and vertical section through the same.

Similar letters, where they occur, denote like parts in both figures.

The nature of my invention consists in constructing the cutter teeth or blade and teeth and the guard-fingers of three several plates of metal, all of similar form and lying closely upon each other, the middle row of teeth being sharpened and stationary, while the upper and lower one is vibrated for the purpose of causing whatever slipping there may be in gathering in the stalks to be cut to come upon the fingers mainly, and thus save the sharp edges of the cutters.

To enable others skilled in the art to make and use my invention, I will proceed to describe the same with reference to the drawings.

A represents the main frame of the machine, the space B being designed for the horses which draw the machine, though they may be hitched elsewhere if found desirable.

C is an axle, upon which the main supporting-wheels D D' are placed. On one of the wheels D is a cogged wheel, E, which meshes with a pinion, F, on one end of a shaft, G, suitably supported on the frame A, and gives motion to said shaft. On the other end of the shaft G, on the opposite side of the machine from the cog and pinion wheels E F, is a pulley, H, around which and around a pulley, I, on a shaft, J, near the front of the machine, passes an endless twisted cord or belt, K, for driving the guards or fingers.

L is a fly or balance wheel, on the opposite end of the shaft J, to steady the motion of the guards. There is a crank, M, on the shaft J, to which a pitman, N, is attached, and this pitman is also connected to a rod, O, so that said rod shall have a reciprocating motion lengthwise of the machine, said rod being supported at P and Q. To the forward end of the rod O is attached one end of a connecting-rod, R, the other end of said rod being attached to a pivoted lever, S, on the front cross-piece, T, of the frame.

U is another connecting-rod, uniting the lever S to the bar which carries the fingers, guards, or gatherers V. By this arrangement it will be readily seen how the guards or fingers receive their vibratory motion. The guards or fingers V are double, as seen in Fig. 2—that is, one set each side of the cutting-teeth W, which are permanently fastened to the frame A A, and these guards or their bar may be furnished with friction-wheels between them and the frame supporting them to cause them to move freely thereon. The object in vibrating the guards or fingers instead of the cutters is to save the sharp edges of the cutters. It is found that before the stalks are sufficiently caught and held to allow the cutting-edges to operate upon them they slip and move considerably. My invention aims at taking the main part of that sliding on the fingers and thus relieve the cutting-edges.

On the axle C is placed a standard, X, Fig. 2, furnished with a series of notches, Y, and near this standard I purpose arranging the driver's seat, so as to put the control or adjustment of the machine in his power, as follows: A pair of small truck-wheels, $a\ a$, support the front part of the machine placed upon an axle, $b$. From this axle projects rearward two rods, $c\ c$, united at their rear ends by a bar, $d$, and to this bar is attached a lifting-piece, $e$, which can be hooked over either of the catches or notches Y in the standard X. The front part of the machine is connected to or rests on the rods $c\ c$ at the point $f$, Fig. 2, and by raising or lowering the lifting-piece $e$ there is a consequent raising or lowering of the cutters, always convenient to and under the control of the driver or operator. When the machine is being turned round at the ends of the swarths, or when going to or returning from the field, the cutters may be raised and held up above all opposing obstacles; and, if found essential, these front wheels may have a motion in the arc of a circle from the point $f$, and thus be made to facilitate the guiding or turning of the machine.

Having thus fully described the nature of my invention, what I claim therein as new, and desire to secure by Letters Patent, is—

Constructing the cutter teeth or blade and teeth and the guard-fingers of three several plates of metal, all of similar form and lying closely upon each other, the middle row of teeth being sharpened and stationary, while the upper and lower ones are vibrated, for the purpose of causing whatever slipping there may be in gathering in the stalks to be cut to come upon the fingers mainly, and thus protect the sharp edges of the cutters, as set forth.

ROBT. J. MORRISON.

Witnesses:
A. B. STOUGHTON,
THOMAS HENRY UPPERMAN.